United States Patent

[11] 3,604,235

| [72] | Inventors | Carl H. Motz<br>Harper Woods;<br>David W. Daniel, Birmingham; Raymond<br>S. Kusz, Mt. Clemens, all of, Mich. |
|---|---|---|
| [21] | Appl. No. | 872,692 |
| [22] | Filed | Oct. 30, 1969 |
| [45] | Patented | Sept. 14, 1971 |
| [73] | Assignee | Lear Sielger, Inc.<br>Santa Monica, Calif. |

[54] ROLLING OF TAPERED GEARS
9 Claims, 2 Drawing Figs.

[52] U.S. Cl. ........................................... 72/84,
72/86, 72/102, 29/159.2
[51] Int. Cl. ........................................... B21d 53/28
[50] Field of Search ........................................ 72/84, 86,
94, 102, 108, 109, 103; 29/159.2

[56] References Cited
UNITED STATES PATENTS

| 1,240,914 | 9/1917 | Anderson .................... | 72/84 |
| 1,240,918 | 9/1917 | Anderson .................... | 72/109 |
| 1,669,818 | 5/1928 | Gleason et al. ............... | 72/84 |

*Primary Examiner*—Richard J. Herbst
*Attorney*—Whittemore, Hulbert & Belknap

ABSTRACT: A machine for finish-rolling rough-cut tapered gears such as hypoid gears, comprising means for meshing a tool or die in the form of a hypoid ring gear with a hypoid pinion in properly meshed relation, and establishing rolling pressure between the die and pinion by effecting advance of the die or pinion in a direction parallel to its axis.

PATENTED SEP 14 1971 3,604,235

INVENTORS
CARL H. MOTZ
DAVID W. DANIEL
BY RAYMOND S. KUSZ
*Whittemore, Hulbert*
*& Belknap*
ATTORNEYS

ROLLING OF TAPERED GEARS

CROSS-REFERENCE TO RELATED APPLICATION

The gear rolling apparatus is closely related to apparatus shown in White et al. application, Ser. No. 872,691, filed of even date herewith.

SUMMARY OF THE INVENTION

The production of hypoid pinions as at present practiced is time consuming and expensive because it is necessary to take three separate cuts to produce the required form of teeth. The first of these cuts is a roughing cut which removes most of the material but leaves sufficient stock so that the opposite sides of the teeth may be finish cut in separate cutting operations. It has proved impractical if not impossible, to finish cut both sides of a hypoid pinion in a single cutting operation, due to the difference in form and action of these tooth surfaces.

In accordance with the present invention a rolling die is produced in the form of a hypoid ring gear conjugate to the final desired form of the hypoid pinion. The die and pinion are supported in mesh for relative movement in a direction parallel to the axis of the die. While the pinion and ring gear die are rotated by direct rotation of either, but preferably the ring gear, pressure is applied tending to move the ring gear in a direction parallel to its axis to establish rolling pressure between the teeth of the die and the teeth of the pinion.

This operation may be carried out with satisfactory results with the pinion at room temperature. Sufficient pressure is applied to displace a few thousandths of an inch of material at the sides of the teeth of the pinion so as to reduce tooth thickness and to bring the profiles at both sides of the teeth of the pinion into the form which is properly conjugate to the tooth form of the hypoid ring gear die.

DETAILED DESCRIPTION

Figures 1, 2:
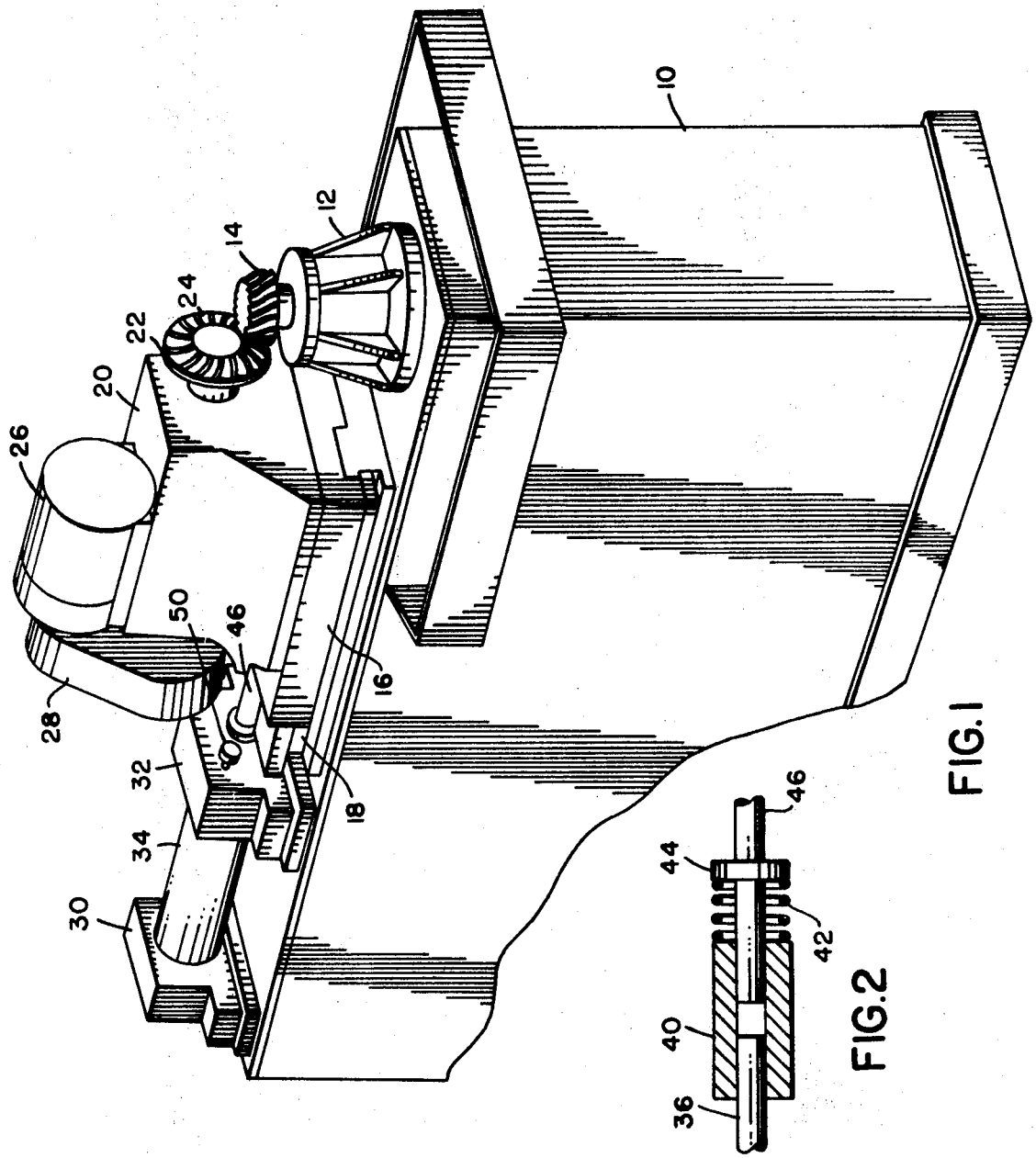
FIG. 1 is a perspective view of apparatus for carrying out the present invention.
FIG. 2 is a fragmentary sectional view of a component of the machine.

Referring now to the drawings, the machine comprises a base 10 which adjacent one end is provided with a live spindle construction 12 for supporting a workpiece 14 in the form of a hypoid pinion for free rotation. The live spindle includes bearing structure capable of supporting the pinion firmly against lateral thrusts developed during the gear finishing operation.

Mounted on the base 10 is a slide 16 movable longitudinally thereon by ways indicated generally at 18. The slide includes a block 20 in which is journaled a spindle (not shown) having an external fixture 22 adapted to mount a die 24 for rotation. The die 24 is in the form of a hypoid ring gear.

Suitable means (not shown) may be provided for effecting adjustment of the block 20 in a horizontal plane perpendicular to the axis of the spindle supporting the die 24 and if desired, conventional means may be provided for effecting vertical adjustment of the spindle 12 carrying the workpiece 14.

Means are provided for effecting positive rotation of the ring gear 24 and this means comprises a motor 26. Preferably, the motor 26 is a hydraulic motor to permit frequent reversal where this is found necessary in carrying out a program of rolling a series of hypoid pinions. Alternatively of course, the motor 26 may be electric, particularly where the rolling operation is carried out without reversal in direction of rotation. In any case, the motor 26 is connected to the spindle carrying the tool fixture 22 by suitable transmission (not shown) included within a transmission housing 28. Mounted between blocks 30 and 32 on the top of the base 10 is a fluid cylinder 34, preferably a hydraulic cylinder containing a piston connected to a piston rod 36 which in turn is connected to the slide 16. Pressure of fluid supplied to the cylinder 34 urges the slide 16 to the right as seen in FIG. 1, and establishes rolling pressure between the teeth of the ring gear die and the teeth of the work gear pinion.

The operation may if desired be carried out automatically, in which case suitable automatic loading and unloading means are provided for feeding rough cut pinions 14 to the spindle 12 and for removing the rolled pinion after the rolling operation has taken place. In such case it is normally desirable to actuate the piston and cylinder mechanism so as to withdraw the die 24 completely from the zone in which it meshes with a pinion to facilitate loading. Thereafter, fluid pressure is supplied to the cylinder 34 to urge the die toward and into meshing relation with the work pinion. In the event that the teeth of the die and pinion do not mesh on initial contact, it is desirable to provide a yielding connection in the piston rod 36 which may take the form of the housing 40 attached thereto as seen in FIG. 2, engaging a spring 42 acting against a head 44 connected to the piston rod extension 46 which is connected to the slide 16. The end of the piston rod 36 in this case is spaced from the head 44 of the piston rod extension 46, by the spring 42 as the die and pinion engage. After the meshing engagement between the teeth of the die and pinion has been assured, further movement of the piston rod 36 collapses the spring 42 and working pressure is applied directly from the piston rod 36 to its extension 46.

In addition, adjustable means are provided for determining the limiting position of the slide 16. This means as diagrammatically indicated in FIG. 2, may constitute an adjustable abutment screw 50 mounted in position to engage a cooperating abutment on the piston or the piston rod 36.

In general, the position of the abutment 50 will be such as to permit the die 24 to move to a position in which the teeth of the pinion 14 assume the required shape after the rolling pressure of the die has been removed.

While in the illustrated use of the apparatus disclosed herein, the rolling die 24 is mounted on the horizontal slide 16 and the work pinion 14 is mounted in a stationary position with its axis vertical, it will of course be understood that the location of the die and pinion may be reversed.

The machine described in the foregoing is characterized by its extreme simplicity and the economy with which it may be produced and operated. Where the machine is specifically designed for performing a rolling operation on identical pinions, the only movement required of the machine are back and forth movement of the slide 16 and of course the rotation of the spindles which support the ring gear die 24 and the work pinion 14.

While in the foregoing the hypoid pinion is disclosed as the workpiece, and the die is disclosed as taking the form of a hypoid ring gear, it will of course be apparent that a hypoid pinion may be employed as the die for rolling the teeth of a conjugate hypoid ring gear.

While the drawings and specification illustrate and describe a hypoid ring gear and pinion, it is apparent that the invention is applicable equally to any type of tapered gear such as bevel or spiral bevel gearing.

What we claim as our invention is:

1. Apparatus for finish rolling the teeth on a work gear member in the form of a tapered ring gear or pinion with a die member in the form of a tapered gear or pinion, substantially conjugate to the desired form of work gear member, comprising an elongated base, a vertical spindle extending above said base adjacent an end thereof, a fixture at the upper end of said spindle for receiving one of said members, a slide on said base, ways between said slide and base extending radially of the axis of said vertical spindle, a horizontal spindle carried by said slide extending parallel to said ways, drive means carried by said slide connected to said horizontal spindle to drive said horizontal spindle in rotation, means on said horizontal spindle for supporting the other of said members in mesh with said one member, and feed means for advancing said slide to establish rolling pressure between the teeth of the die and the teeth of a work gear sufficient to displace metal thereon to produce the required tooth form at both sides thereof.

2. Apparatus as defined in claim 1 in which the die member is in the form of a hypoid ring gear and is carried by said horizontal spindle.

3. Apparatus as defined in claim 1 in which the die member is in the form of a hypoid ring gear and is carried by said vertical spindle.

4. Apparatus as defined in claim 1 in which the die member is in the form of a hypoid ring gear and is carried by said horizontal spindle.

5. Apparatus as defined in claim 1 in which the die member is in the form of a hypoid ring gear and is carried by said vertical spindle.

6. Apparatus as defined in claim 1 in which said drive means comprises a fluid-actuated motor.

7. Apparatus as defined in claim 1 in which said feed means comprises a fluid-actuated piston and cylinder device.

8. Apparatus as defined in claim 6 in which said feed means comprises a fluid-actuated piston and cylinder device.

9. Apparatus as defined in claim 7 which comprises a stop to determine the maximum travel of said slide toward said spindle.